(12) United States Patent
Srivastava

(10) Patent No.: US 11,663,070 B2
(45) Date of Patent: *May 30, 2023

(54) ROOT CAUSE ANALYSIS OF LOGS GENERATED BY EXECUTION OF A SYSTEM

(71) Applicant: salesforce.com, inc., San Francisco, CA (US)

(72) Inventor: Siddharth Srivastava, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/575,014

(22) Filed: Jan. 13, 2022

(65) Prior Publication Data

US 2022/0206886 A1   Jun. 30, 2022

Related U.S. Application Data

(63) Continuation of application No. 17/134,060, filed on Dec. 24, 2020, now Pat. No. 11,226,858.

(51) Int. Cl.
   *G06F 11/00* (2006.01)
   *G06F 11/07* (2006.01)
   *G06F 11/34* (2006.01)

(52) U.S. Cl.
   CPC ........ *G06F 11/079* (2013.01); *G06F 11/3476* (2013.01)

(58) Field of Classification Search
   CPC .......................... G06F 11/079; G06F 11/3476
   See application file for complete search history.

(56) References Cited

U.S. PATENT DOCUMENTS

| | | | |
|---|---|---|---|
| 7,516,362 B2 | 4/2009 | Connelly et al. | |
| 8,001,527 B1 | 8/2011 | Qureshi et al. | |
| 8,209,567 B2 | 6/2012 | Cohen et al. | |
| 8,656,219 B2 | 2/2014 | Suit | |
| 9,294,338 B2 | 3/2016 | Nagai et al. | |
| 9,678,822 B2 | 6/2017 | Jacob | |
| 10,176,799 B2 | 1/2019 | Hori et al. | |
| 10,289,509 B2 | 5/2019 | Xu et al. | |
| 10,530,795 B2 | 1/2020 | Pande et al. | |
| 10,649,882 B2 | 5/2020 | Li et al. | |
| 11,003,568 B2 | 5/2021 | Smith et al. | |
| 11,048,608 B2 | 6/2021 | Brown et al. | |
| 11,226,858 B1 * | 1/2022 | Srivastava | G06F 11/3476 |
| 2016/0162473 A1 | 6/2016 | Cogley et al. | |
| 2018/0314953 A1 | 11/2018 | Benedict et al. | |
| 2020/0076833 A1 | 3/2020 | Ladnai et al. | |

* cited by examiner

*Primary Examiner* — Elmira Mehrmanesh
(74) *Attorney, Agent, or Firm* — Fenwick & West LLP

(57) ABSTRACT

A system stores logs representing events that occur in the system based on executable instructions executed by the system, for example, by processes executing within the system or by applications. The system analyzes the logs to determine the root cause of the error or event that resulted in generation of the log. The system clusters logs to determine clusters of logs. The system analyzes logs of each cluster to determine a root cause of errors resulting in logs belonging to the cluster. For any new error log that is received, the system determines the cluster to which the error log belongs and takes action based on the root cause associated with the cluster, for example, sending an alert message or performing automatic remediation.

20 Claims, 7 Drawing Sheets

ROOT CAUSE ANALYSIS OF LOGS GENERATED BY EXECUTION OF A SYSTEM

CROSS REFERENCE TO RELATED APPLICATIONS

This application claims the benefit of U.S. patent application Ser. No. 17/134,060 filed on Dec. 24, 2020 and issued as U.S. Pat. No. 11,226,858, which is incorporated herein by reference in its entirety.

BACKGROUND

Field of Art

This disclosure relates in general to analysis of logs generated during execution of a system, and more specifically to root cause analysis of error logs to determine an action to take based on the errors, such as sending an alert or automatic remediation.

Description of the Related Art

Software system generate error logs to track any failures that occur during execution of various processes. The generated logs store different types of information including stack trace and values of variables and parameters during execution of the system to help analyze the cause of the system failure. Root cause analysis is performed to identify the cause of system failures. Root cause analysis refers to techniques performed to discover events that caused a specific system failure.

Complex systems have several components, each generating logs and storing different types of information in the error logs. Complex systems may involve multiple teams, each team including several developers. Different people may have knowledge of different components of the complex system. Knowledge of a component may be required to recognize the type of error. This makes it difficult to perform even a preliminary analysis to direct the information to the right set of people. Furthermore, complex systems often generate large amount of system logs. This makes analysis of the error logs complex and error prone process. Furthermore, strong expertise and knowledge of the system architecture and system design is required even to identify the right people to further analyze the problem.

Figure 1:
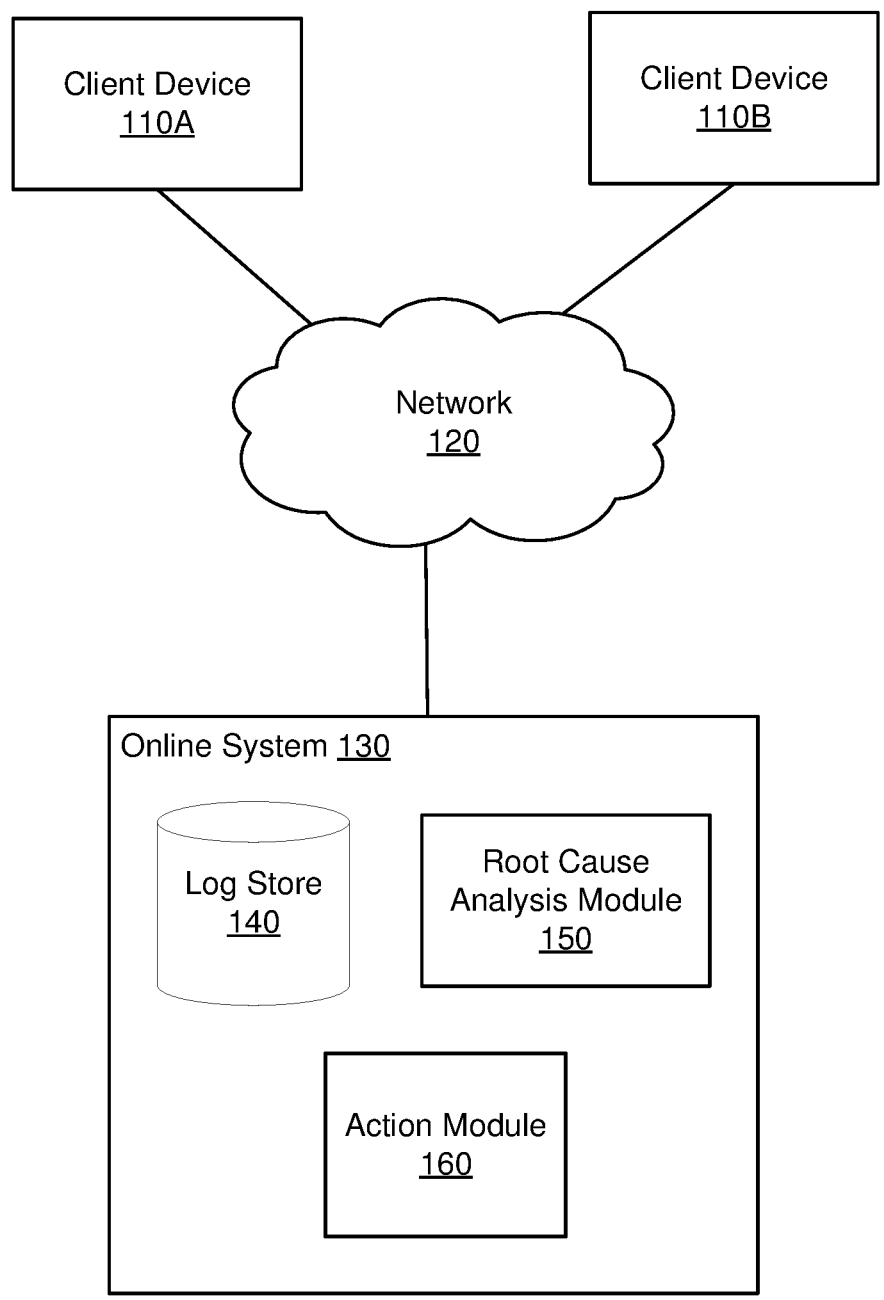
FIG. 1 shows the overall system environment for performing root cause analysis of error logs, according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

Systems generate logs that store information describing actions performed by processes or applications executing in the system. A particular type of information stored in the logs is error information describing system failures or other types of errors encountered during execution of processes and applications. An error may occur if a process or an application encounters an unexpected situation or performs malfunction. An example of an error is a system attempting to access a resource that does not exist, for example, the system attempting to open a file that does not exist, the system attempting to access a peripheral device that does not exist, a system accessing a portion of data structure that does not exist (e.g., an element of an array that is outside the size of the array), the system encountering a timeout while waiting for a resource, and so on. Whether a situation encountered by a process or an application is identified as an error may depend on a developer that designed the software for the process or the application. For example, a developer may make certain assumptions when designing the software. If a situation is encountered that violates the assumptions, the developer may log the situation as an error situation. The log storing this information may include a flag that identifies the log as an error log.

A system according to an embodiment analyzes logs to determine the root cause of the error or the event that resulted in generation of the log. The system perform clustering of available logs to determine a plurality of clusters of logs. The system analyzes logs of each cluster to determine a root cause of errors resulting in logs belonging to the cluster. For any new error log that is received, the system determines the cluster to which the error log belongs and takes action based on the root cause associated with the cluster.

Overall System Environment

FIG. 1 shows the overall system environment for performing root cause analysis of error logs, according to one embodiment. The system environment 100 includes an online system 130, one or more client devices 110, and a network 120. Other embodiments may include more or fewer components.

The online system 130 comprises a log store 140, a root cause analysis module 150, and an action module 160. In other embodiments, the online system 130 may include more or fewer modules. Functionality indicated herein as implemented by a particular module may be implemented by other modules.

The log store 140 stores logs generated by processes executing on the online system 130. For example, the online system 130 may execute various processes. Actions taken by the processes may result in generation of logs. A log may store information describing an event that occurs in the online system, for example, a message received by the online system, an API invoked by the online system, or any other operation performed by the online system. The information stored in a log is defined and implemented by software developers that develop the instructions of the software program executed by the process that stored the log.

A log may indicate a type of information stored in the log. For example, a log may store information describing a normal action performed or a system failure that occurred. A log may store a warning information indicating a state of the system that needs attention, for example, if the system load exceeds a threshold value. In an embodiment, the logs are stored in a database, for example, a table of as relational database. Alternatively, the logs may be stored as a flat file, for example, as text messages with separators between logs. Each log may include a flag indicating a type of the log, for example, INFO indicating log has information of a normal operation, WARNING indicating the log represents a warning message, or ERROR indicating the log is an error log storing system failure information or failure of a specific process. In some embodiments the logs are stored in a distributed file system such that different processes may write to different portions of the file system concurrently.

An error log stores a message describing a system failure that occurred or any other condition identified as an error condition. An error log may store a stack track describing the process stack of the process that generated the error log, for example, the call stack representing the function invocations that were being performed when a system failure occurred. The log message may include data such as names and values of variable or parameters of functions that were available when the log message was generated.

The root cause analysis module 150 analyses an error log stored in the log store 140 to determine the root cause of the error that resulted in creation of the log. In an embodiment, the root cause analysis module 150 generates a high-level summary of information stored in an error log. In an embodiment, the root cause analysis module 150 classifies an error log to map the error log to a category of errors selected from a plurality of categories of errors. Details of the log classification module 150 are described in further detail herein, for example, in FIG. 2.

The action module 160 performs actions based on the root cause analysis performed by the root cause analysis module 150. For example, the action module 160 may send information describing the analysis performed by the root cause analysis module 150 for display on a display screen of a client device 110. In an embodiment, the action module 150 stores information describing users or teams of users responsible for performing analysis of different types of errors. The action module 160 obtains a category of error based on the analysis of an error log performed by the root cause analysis module 150 and identifies a user or a team of users that need to further analyze the error log based on the category of error. Accordingly, the action module 160 sends an alert or a message to the user or team of users responsible for modules associated with the category of errors. The alert or the message may describe the root cause in the error log.

In an embodiment, the action module 160 stores possible automatic remedial actions that can be taken for certain category of errors. The action module 160 receives information describing the root cause analysis of an error log performed by the root cause analysis module 150. The received information may describe a category of errors associated with the error log. The action module 160 determines the remedial action that needs to be taken in response to the category of error as determined by the root cause analysis 150 for an error log. The action module 160 executes instructions for the remedial action or invokes one or more other software modules with the appropriate parameters to cause the software modules to take the necessary remedial action.

Although the techniques disclosed herein are described in connection with an online system, the techniques may be implemented by any computing system, for example, a computing system that processes error logs offline. For example, a system may obtain error logs from a production system and store them in the error log store 140. The system may perform the root cause analysis of the error logs offline and then display the result of the analysis on a monitor of the system.

The client devices 110 and the online system 130 represent computing devices. A computing device can be a conventional computer system executing, for example, a Microsoft™ Windows™-compatible operating system (OS), Apple™ OS X, and/or a Linux distribution. A computing device can also be a device having computer functionality, such as a personal digital assistant (PDA), mobile telephone, video game system, etc. Each computing device stores software modules storing instructions.

The interactions between the client devices 110 and the online system 130 may be performed via the network 120. In various embodiments, the network 120 uses a networking protocol such as the transmission control protocol/Internet protocol (TCP/IP), the user datagram protocol (UDP), internet control message protocol (ICMP), etc. The data exchanged over the network can be represented using technologies and/or formats including the hypertext markup language (HTML), the extensible markup language (XML), etc.

In some embodiment, the online system 130 is a multi-tenant system that stores data of one or more tenants. Each tenant may be an enterprise or an organization that represents a customer of the multi-tenant system. Each tenant may have multiple users that interact with the multi-tenant system via client devices. Various elements of hardware and software of the multi-tenant system may be shared by multiple tenants. In an embodiment, an application being tested is a tenant application that accesses data stored in the multi-tenant system, for example, in tables of databases of the multi-tenant system. The application may be developed using tools and services provided by the multi-tenant system. The application may invoke services provided by the multi-tenant system, for example, to configure web pages.

In one embodiment, a multi-tenant system implements a web-based customer relationship management (CRM) system. For example, the multi-tenant system may store applications configured to implement and execute CRM software applications. As an example, one tenant might be a company that employs salespersons that use client devices to manage their sales process. Thus, a user might maintain contact data, leads data, customer follow-up data, performance data, goals and progress data, etc., all applicable to that user's personal sales process.

A multi-tenant system includes a data store that stores data for various tenants of the multi-tenant system. It is transparent to tenants that their data may be stored in a data store that is shared with data of other tenants. The data store may store data for different tenants in separate physical structures, for example, separate database tables or separate databases. Alternatively, the data store may store data of multiple tenants in a shared structure. For example, user accounts for all tenants may share the same database table. However, the multi-tenant system stores additional information to logically separate data of different tenants. Accordingly, data of one tenant is kept logically separate from that of other tenants so that one tenant does not have access to another tenant's data, unless such data is expressly shared.

Since a multi-tenant system may store information for several enterprises or organizations, the multi-tenant system needs a large number of servers running a large number of DBMSs. Each DBMS may be shared across multiple tenants. Accordingly, a multi-tenant system needs to implement policies to relocate DBMSs in case of failover to ensure that the DBMSs have very small downtime.

System Architecture

Figure 2:
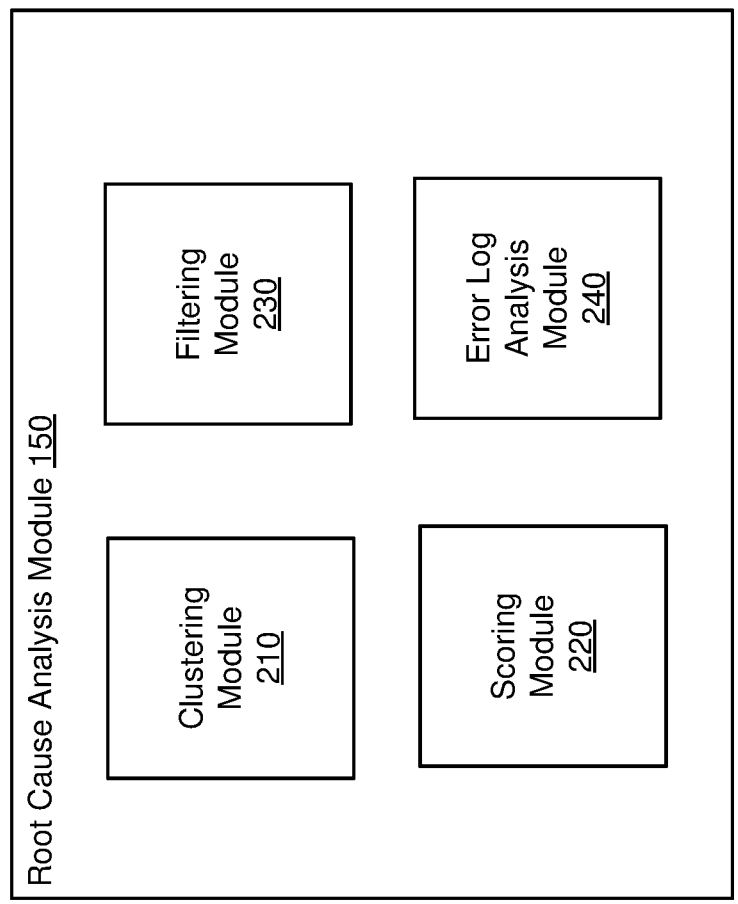
FIG. 2 is a block diagram illustrating components of a root cause analysis module according to one embodiment.

FIG. 2 is a block diagram illustrating components of a root cause analysis module according to one embodiment. The root cause analysis module 150 comprises a clustering module 210, a scoring module 220, a filtering module 230, and an error log analysis module 240. Other embodiments may include more or fewer modules than those shown in FIG. 2. Functionality indicated as being performed by a particular module may be performed by other modules than those indicated herein. Furthermore, steps of any processes described herein can be performed in an order different from that illustrated herein.

The clustering module 210 receives error logs as input and generates clusters of error logs. A cluster may also be referred to as a group. Each cluster of error logs includes logs that are similar to each other and are likely to have the same root cause. For example, a particular type of system failure may generate error logs that are likely to belong to the same cluster. In an embodiment, the clustering module 210 extracts terms (or keywords) from each error log and then generates clusters based on comparison of the terms of the error logs. In another embodiment, the clustering module 210 provides the error logs as input to a neural network. The clustering module 210 extracts a feature vector representation of the error log from the neural network, for example, the output of a hidden layer of the neural network. In an embodiment, the neural network is a multi-layered perceptron trained to receive an encoding of an error log and predict an output representing a score based on the error log, for example, a score representing a category of the error log.

In an embodiment, the clustering module 210 generates a plurality of clusters, each cluster associated with a feature vector of the centroid of the cluster. The clustering module 210 receives an error log and determines a feature vector representation of the error log. The clustering module 210 determines the closest cluster based on a measure of distance between the feature vector representation of the received error log and the centroids of the available clusters. In an embodiment, the clustering module 210 assigns the received error log to the cluster that has a centroid that is closest to the feature vector representation of the received error log. In an embodiment, the clustering module 210 assigns the received error log to the cluster, provided the measure of distance between the feature vector representation of the received error log and the centroid of the cluster is below a threshold value. If none of the existing clusters have a centroid that is within the threshold of the feature vector representation of the received error log, the clustering module 210 creates a new cluster for the received error log. Each time an error log is added to a cluster, the clustering module 210 recalculates the centroid of the cluster.

In an embodiment, the clustering module 210 also maintains a size of each cluster and recalculates the size every time a new error log is added to the cluster. If a cluster increases in size above a threshold value, the clustering module 210 may split the cluster into two smaller clusters.

In an embodiment, the clustering module 210 uses a machine learning based model trained to classify error logs. The machine learning based model receives an error log as input and predicts a label for classifying the error log. The label maps the error log to a cluster. In an embodiment, a one hot vector representation of the error log is generated for providing as input to the machine learning based model used for classifying the error log or the neural network used for generating the feature vector representation of the error log.

The scoring module 220 determines scores for terms in the error logs. In an embodiment, the scoring module 220 determines a cluster characterization score for each term of an error log. The cluster characterization score for a term represents a measure of a degree to which the term characterizes that particular cluster. The phrase cluster characterization score may also be referred to herein as a group characterization score.

A term characterizes a particular cluster of error logs if the term has a high likelihood of occurring in that particular cluster of error logs but relatively low likelihood of occurring in the remaining clusters of error logs indicates that the term characterizes the cluster of error logs. For example, a term is determined to characterize the particular cluster of error logs if it has (1) a likelihood of occurrence in that particular cluster of error logs that exceeds a first threshold value and (2) a likelihood of occurrence in the remaining clusters of error logs that is below a second threshold value.

Figure 3:
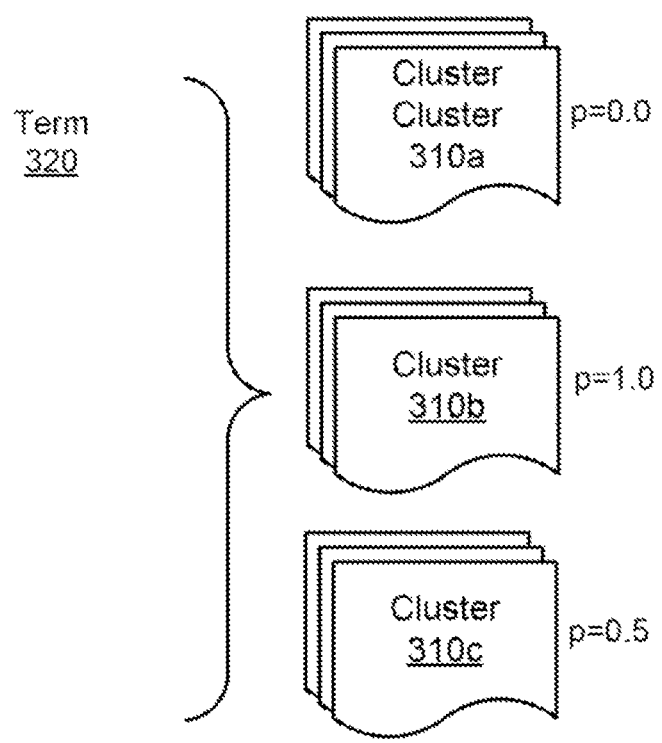
FIG. 3 illustrates the determination of likelihood of occurrence of a term in a clusters of error logs according to an embodiment.

In an embodiment, the scoring module 220 determines for each term that occurs in a log, the probability of occurrence in each cluster of error logs. For example, FIG. 3 illustrates the determination of likelihood of occurrence of a term in the clusters of error logs according to an embodiment. FIG. 3 shows three clusters of error logs shown as clusters 310a, 310b, and 310c. The scoring module 220 determines the likelihood of occurrence of the term 320 in different clusters 310. In an embodiment, the scoring module 220 determines the likelihood of occurrence in a cluster as the ratio of (1) the number of error logs of the cluster in which the term occurs and (2) the total number of error logs in the cluster. For example, the likelihood of occurrence of term 320 in cluster 310a is p=0.0, in cluster 310b is p=0.5, and in cluster 310c is p=1.0.

The scoring module 220 determines the cluster characterization score for terms of logs. The cluster characterization score of a term for a cluster is a value indicative of the degree to which the term characterizes that cluster. For example, high cluster characterization score for a term T for a particular cluster indicates that the term is more likely to occur in logs of that particular cluster and less likely to occur in logs of clusters other than this particular cluster. The scoring module 220 determines the cluster characterization score for a term T for a cluster C as a value that varies directly as the likelihood of occurrence of the term T in cluster C and a varies inversely as an aggregate likelihood of occurrence of the term T in all remaining clusters other than cluster C. The aggregate likelihood of occurrence of the term T across a set of clusters may be an average value of likelihood of occurrence over the set of clusters. Alternately, the aggregate likelihood of occurrence of the term T across a set of clusters may be any statistical aggregate, for example, a median, mode, and so on.

The cluster characterization score $S_j^k$ for a term k with respect to cluster j may be represented as $S_j^k = F_j^k / \Sigma_n F_i^k$, where $F_j^k$ is the frequency of occurrence of the term k in the cluster j. The cluster characterization score $S_j^k$ is obtained by dividing the frequency of occurrence of the term k in the cluster j by the aggregate measure of frequency of occurrence of term k in the remaining clusters, for example, a summation over n clusters.

The filtering module 230 preprocesses logs in preparation for root cause analysis of the logs by filtering out certain terms from logs. According to various embodiments, the filtering module 230 filters out terms that are likely to occur in logs of a cluster but do not represent the cluster, i.e., terms that do not characterize the cluster. Accordingly, the filtering module 230 filters out terms that occur in logs of the cluster but have less than a threshold likelihood of occurrence in the cluster. These terms may represent keywords such as entity names or identifiers that are specific to a particular log or set of logs but do not occur in the cluster of logs in general. For example, logs describing a system failure may include terms representing names or identifiers of objects that were identified when the system failure occurred. The corresponding names and identifiers may change if a similar system failure occurred in a different context. However, if the two occurrences of system failures had the same root cause, the logs describing the two system failures are likely to occur in the same cluster of logs. Accordingly, for determining a description of the root cause of the errors described in logs of a cluster of error logs, the terms representing names and identifiers are not useful and the filtering module 230 excludes them from analysis of the root cause of the cluster.

In some embodiments, the filtering module 230 performs robust principal component analysis (PCA) to identify terms that are relevant for performing root cause analysis and terms that are unique to specific logs but not commonly occurring in the cluster and therefore not useful for performing root cause analysis. The filtering module 230 filters out terms that are not useful for performing root cause analysis.

According to an embodiment, the filtering module 230 creates a matrix by stacking term vector of a set of logs. The matrix columns represent all words that occurred in logs, for example, each column representing a word. Each row represents occurrence of those words in a particular log, for example, the matrix element may be 1 if the word occurs in the log and zero if the word does not occur. The filtering module 230 applies robust PCA to the matrix created and uses the process to divide the matrix into a sparse portion and a dense portion. The sparse portion contains words which are unique to individual logs that do not characterize the cluster of logs. The dense portion of the matrix contains words which are commonly occurring in the cluster of logs and therefore useful for root cause analysis. The filtering module 230 filters out the terms representing the sparse portion of the matrix from the logs.

Figure 4:
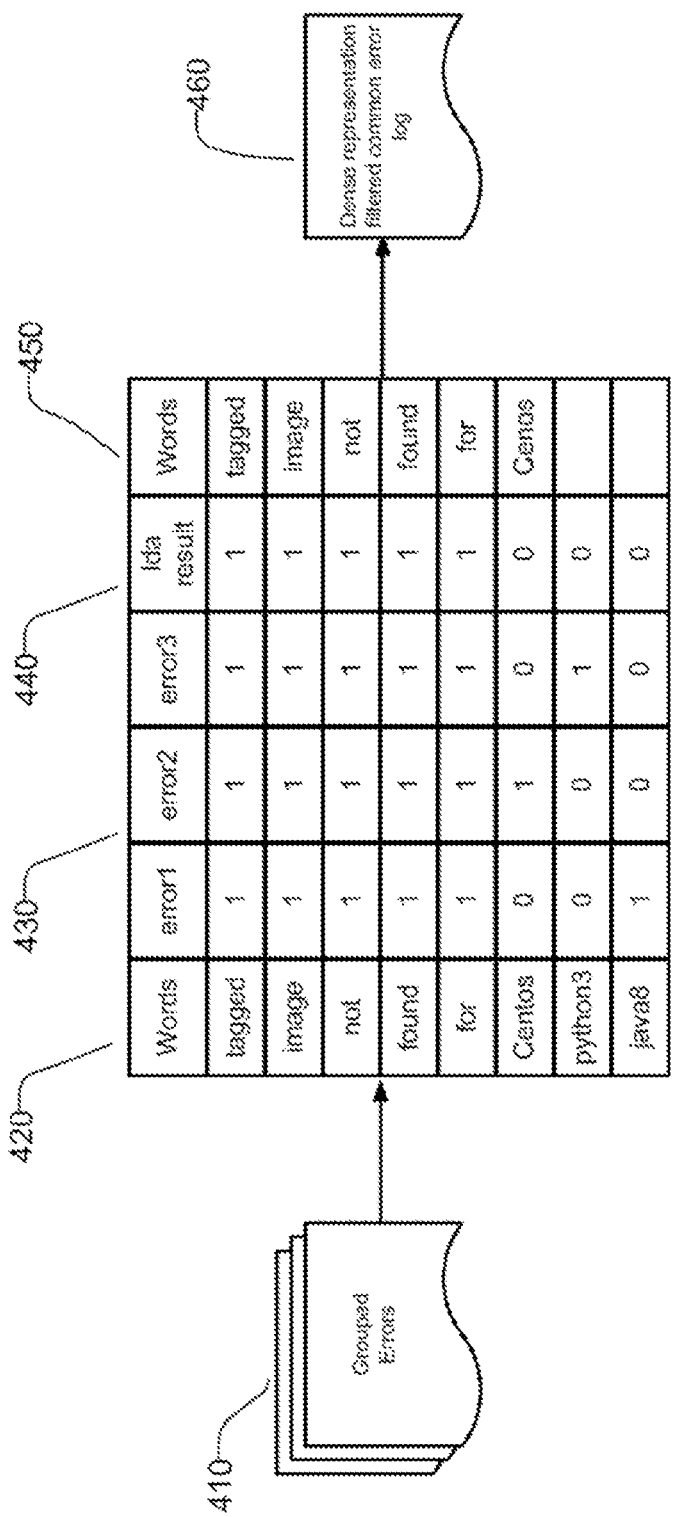
FIG. 4 illustrates preprocessing of error logs by filtering terms of error logs according to one embodiment.

FIG. 4 illustrates preprocessing of error logs by filtering terms of error logs according to one embodiment. As shown in FIG. 4, the system determines a vector representation 430 of words in the logs of a cluster (or group) of logs 410. The vector representation 430 may be a one-hot vector representation of all words 420 of the logs of the cluster 410. Accordingly, the vector representation 430 of an error log includes a value 1 if the word is present in the error log and a value 0 if the word is absent from the error log. The filtering module 230 performs a robust PCA analysis or a linear discriminant analysis (LDA) to determine result 440 indicating whether a word is significant for the cluster or should be filtered out. For example, if the result of LDA analysis as shown in column 440 is 1, the filtering module 230 keeps the word in the error log for further analysis and if the result of LDA analysis as shown in column 440 is 0, the filtering module 230 removes the word from the error log for further analysis. Based on the result of the robust PCA analysis or LDA analysis, the system determines a set 450 of words that are kept in the error logs for further analysis. The root cause analysis module 150 generates a dense representation 460 of the error logs based on the words determines to be significant for root cause analysis after filtering out the remaining words. The root cause analysis module 150 analyzes the dense representation of the error logs.

The error log analysis module 240 analyses the dense representation of error logs to generate a summary of the root cause of a cluster of error logs. The error log analysis module 240 may generate a summary of the root cause for the cluster of error logs. Alternatively, the error log analysis module 240 may generate a label describing the cluster of error logs. The label may be generated by concatenating terms of the summary of the root cause. In an embodiment, the error log analysis module 240 selects a window of terms of an error log from the cluster, wherein the window represents a set of adjacent terms of the error log that has previously been filtered by the filtering module 230. The error log analysis module 240 selects the window that maximizes the aggregate cluster characterization score of the terms that occur within the window. The error log analysis module 240 may determine the aggregate cluster characterization score as a statistical aggregate of the cluster characterization scores of all the terms within the window, for example, the sum, the average, the median, or the mode of the cluster characterization scores of all the terms within the window. For example, the error log analysis module 240 may sample a few error logs from the cluster of error logs and inspect one or more windows for each error log by comparing the aggregate cluster characterization scores of terms within each window. Within the same error log, the error log analysis module 240 may identify multiple windows and compare the aggregate cluster characterization scores of terms within each window of the error log to determine the window that has the maximum aggregate cluster characterization score. The error log analysis module 240 may use a sliding window within each error log to modify a window by including an additional term on one end of the window and eliminating a term on the other end of the window to obtain the next window. The error log analysis module 240 repeats the sliding process to obtain a sequence of windows of the error log. The error log analysis module 240 compares the aggregate cluster characterization scores of terms within each window obtained by sliding the window for each error log sampled and selects the window with the maximum aggregate cluster characterization score across all windows analyzed and also across all error logs sampled for analysis.

The error log analysis module 240 uses the terms of the window determined to maximize aggregate cluster characterization score. For example, the error log analysis module 240 may select all the terms of the window in the order in which the occur in the window and use them as the summary of the root cause of the cluster of error logs. Alternatively, the error log analysis module 240 may concatenate all the terms of the window in the order in which they occur within the window to generate a label for the cluster of error logs. The labels or the summary generated for the various clusters indicate the root cause of the error represented by the error logs of the cluster. The error log analysis module 240 provides the label or summary generated to the action module 160 so that the action module can take appropriate action when an error log that belongs to that cluster is obtained. Each cluster of error logs is associated with a category of errors that may be further associated with a team of developers or users or with a remedial action that needs to be taken when an error belonging to the category of errors occurs.

Figure 5:
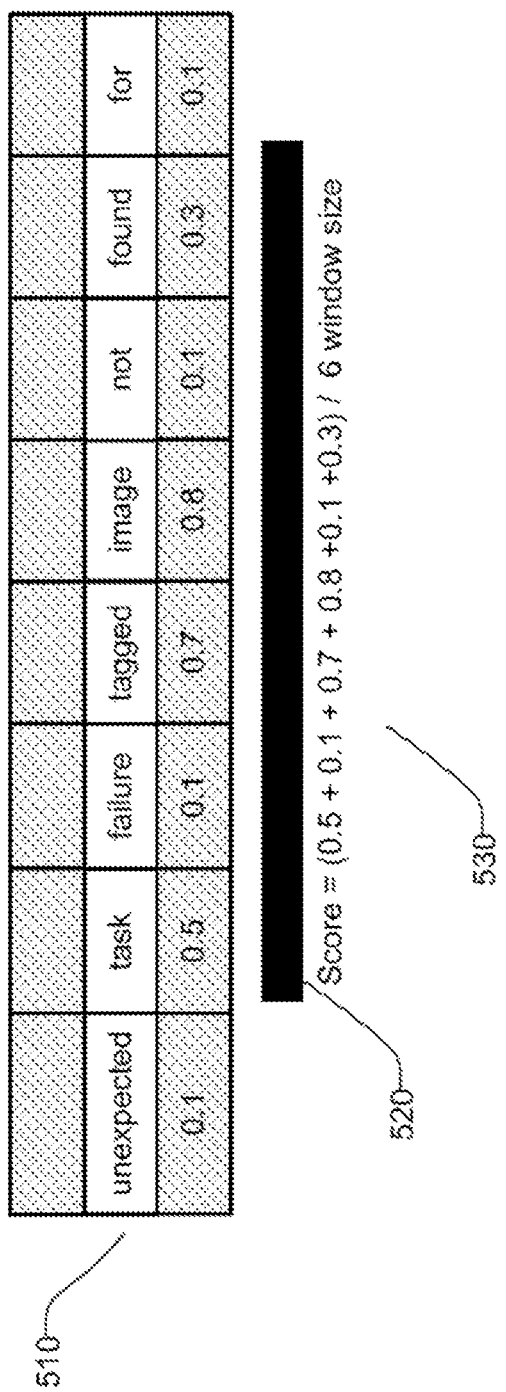
FIG. 5 illustrates determination of aggregate characterization scores of clusters using sliding windows according to one embodiment.

FIG. 5 illustrates determination of aggregate characterization scores of clusters using sliding windows according to one embodiment. The sequence 510 of terms represents the filtered error log. The subsequence 520 within the sequence 510 represents a window of terms. The error log analysis module 240 determines the score 530, for example, an average of the cluster characterization scores of the terms within the window 520 of the sequence of terms of the error log 510. The error log analysis module 240 further slides the window, for example, by sliding the window by one term to the right to obtain another window for further analysis.

Overall Process

Figure 6:
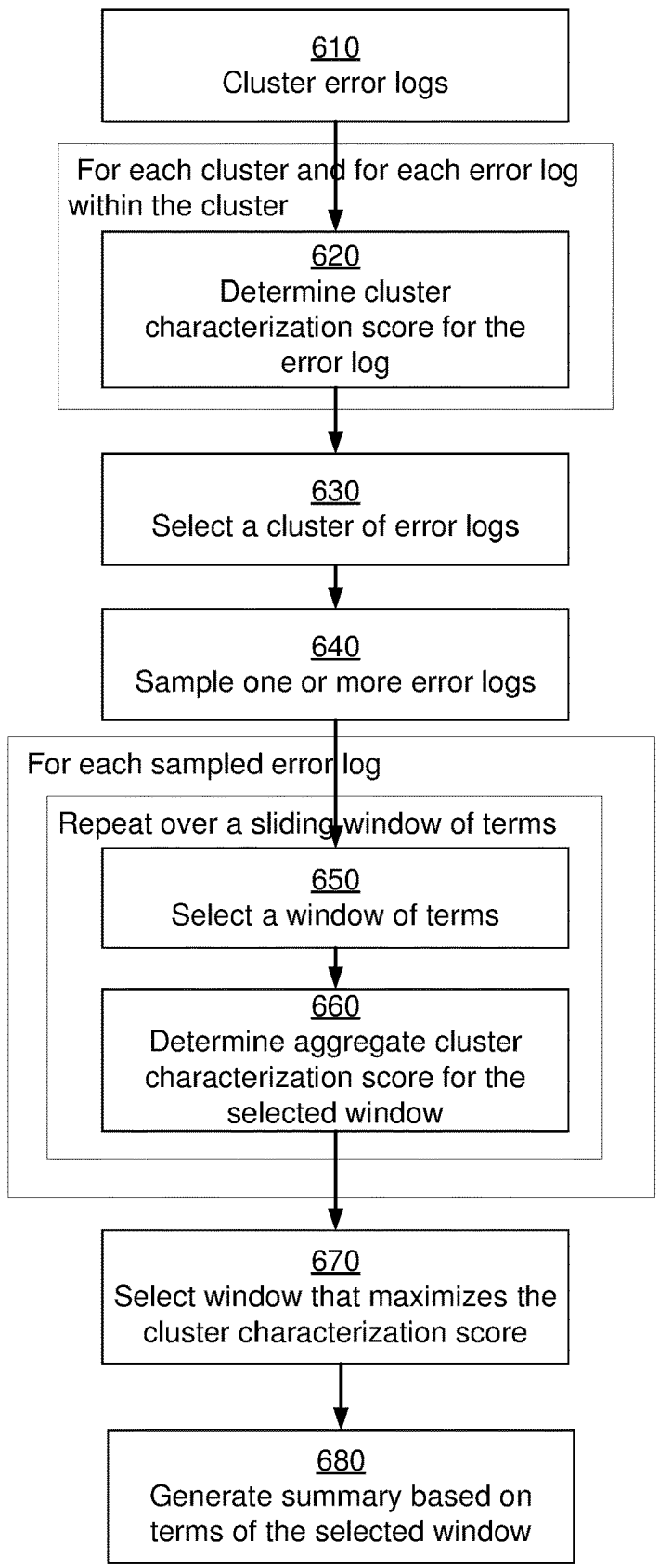
FIG. 6 is a flow chart illustrating the process for performing root cause analysis of error logs according to one embodiment.

FIG. 6 is a flow chart illustrating the process for performing root cause analysis of error logs according to one embodiment. Various embodiments can perform the steps of FIG. 3 in different orders than those indicated herein. Moreover, other embodiments can include different and/or additional steps than the ones described herein.

The root cause analysis module 150 performs clustering 610 of an input set of error logs generated by the system to generate a plurality of clusters of error logs. The root cause analysis module 150 performs analysis of the generated clusters of logs. For each cluster of logs, of for a subset of cluster of error logs, the root cause analysis module 150 repeats the step 620. The root cause analysis module 150 selects a cluster of error logs from the plurality of clusters of error logs and for each error log, or for at least a subset of error logs from the cluster, the root cause analysis module 150 determines 620 a cluster characterization score for the error log. The cluster characterization score represents a likelihood of the term occurring in the selected cluster of error logs but not in the remaining clusters of error logs.

The root cause analysis module 150 further selects 630 a cluster of error logs for analysis. The root cause analysis module 150 selects one or more error logs from the cluster of error logs, for example, by sampling 640 one or more error logs. The root cause analysis module 150 performs the following analysis for each sampled error log. The root cause analysis module 150 repeats the steps 650 and 660 over a set of windows of terms, for example, a set of windows obtained by sliding a window of consecutive terms or adjacent terms of the error log. The root cause analysis module 150 selects 650 a window of terms and determines 660 an aggregate cluster characterization score for the selected window.

The root cause analysis module 150 selects 670 a window from the set of windows such that the selected 670 window maximizes the aggregate cluster characterization score across the set of windows and across the sampled error logs. The root cause analysis module 150 generates 680 a summary for the cluster of error logs based on the terms of the selected window. The generated summary or label for each cluster is stored in connection with the cluster, for example, as metadata describing the cluster.

If a new error log is received for example in response to events that occur in the system, the system determines the cluster of error logs that the received error log belongs to. For example, the system may determine a feature vector representation V of the error log and measure a distance between the feature vector representation V and each cluster, for example, a distance between the feature vector V and a feature vector Vc that represents the centroid of each cluster. The system determines the cluster to which the error log belongs as the cluster that is closest to the feature vector V based on the determined distances between the feature vector V and the centroids of the clusters of error logs. The system retrieves the summary or label generated for the selected cluster and uses the generated summary or label for determining the action to be taken, for example, displaying a message via a user interface, sending an alert to a user, or performing automatic remediation. The techniques described herein allow a system to take actions based on analysis of error logs such as sending an alert to a user, automatic remediation for a system failure or error, scheduling of tasks necessary for taking actions in response to the error, and so on.

The techniques described herein in terms of error logs can be applied to any kind of logs for example, logs that provide information describing certain events that occur in a process or application or warning logs that represent warning indicating a certain event is likely to occur.

Computer Architecture

Figure 7:
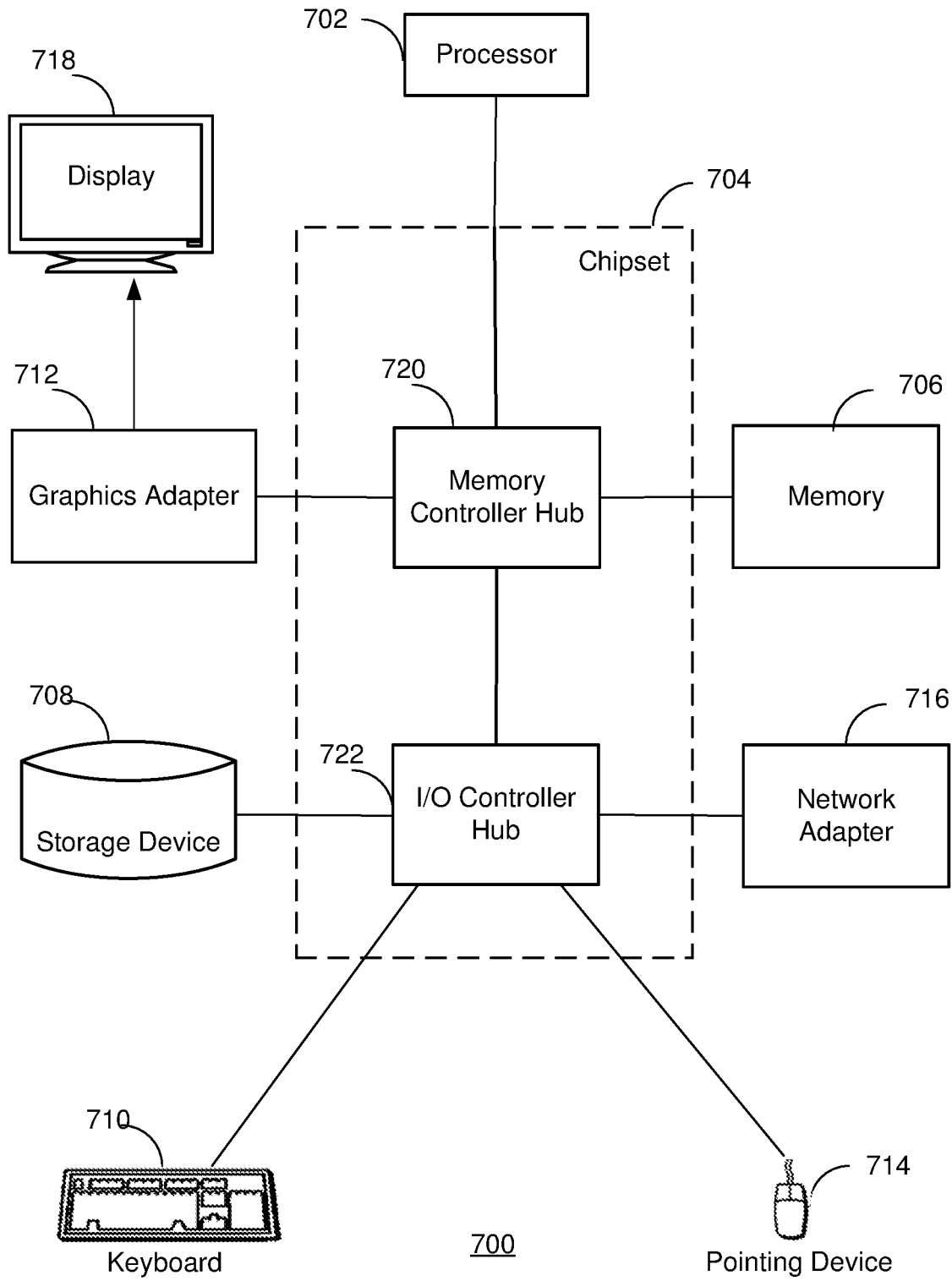
FIG. 7 is a block diagram illustrating the architecture of a typical computer system for use in the environment of FIG. 1 according to one embodiment.

FIG. 7 is a block diagram illustrating the architecture of a typical computer system for use in the environment of FIG. 1 according to one embodiment. Illustrated are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is a non-transitory computer-readable storage medium, such as a hard drive, compact disk read-only memory (CD-ROM), DVD, or a solid-state memory device. The memory 706 holds instructions and data used by the processor 702. The pointing device 714 may be a mouse, track ball, or other type of pointing device, and is used in combination with the keyboard 710 to input data into the computer system 200. The graphics adapter 712 displays images and other information on the display 718. The network adapter 716 couples the computer system 700 to a network.

As is known in the art, a computer 700 can have different and/or other components than those shown in FIG. 7. In addition, the computer 700 can lack certain illustrated components. For example, a computer system 700 acting as an online system 110 may lack a keyboard 710 and a pointing device 714. Moreover, the storage device 708 can be local and/or remote from the computer 700 (such as embodied within a storage area network (SAN)).

The computer 700 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 708, loaded into the memory 706, and executed by the processor 702.

The types of computer systems 700 used by the entities of FIG. 1 can vary depending upon the embodiment and the processing power used by the entity. For example, a client device 104 may be a mobile phone with limited processing power, a small display 718, and may lack a pointing device 714. The online system 110 in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real-time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

What is claimed is:

1. A computer-implemented method for analyzing error logs generated by a system, the method comprising:
   clustering error logs generated by the system to generate a plurality of clusters;
   selecting a cluster from the plurality of clusters;
   determining a cluster characterization score of terms of error logs of the cluster, wherein a cluster characterization score of a term represents a likelihood of the term occurring in the cluster but not in remaining clusters of the plurality of clusters;
   selecting a window of consecutive terms of an error log of the cluster, wherein the window maximizes an aggregate value of cluster characterization scores of terms across a plurality of windows obtained from the cluster; and
   generating a summary from the window for storing in association with metadata describing the cluster.

2. The computer-implemented method of claim 1, further comprising:
   filtering error logs of the cluster by excluding words having high likelihood of occurrence in the error log but low likelihood of occurrence in the cluster.

3. The computer-implemented method of claim 2, wherein filtering error logs of the cluster comprises performing principal component analysis of the error logs.

4. The computer-implemented method of claim 1, wherein selecting the window comprises, sliding a window across the error log, comprising:
   identifying a first window of consecutive words of the error log; and
   identifying a second window of consecutive words of the error log that overlaps the first window but excludes one or more words of the first window and includes one or more words from outside the first window.

5. The computer-implemented method of claim 1, wherein clustering error logs comprises:
   for each error log, generating a feature vector representing features of the error log; and
   clustering feature vectors generated from the error logs to determine the plurality of clusters.

6. The computer-implemented method of claim 5, wherein the feature vector representing features of the error log is extracted from a hidden layer of a neural network, wherein the neural network receives a representation of the error log as input.

7. The computer-implemented method of claim 1, further comprising:
receiving a new error log;
determining a cluster of error logs to which the new error log belongs; and
performing an action based on the summary.

8. The computer-implemented method of claim 7, wherein determining a cluster of error logs to which the new error log belongs comprises identifying the cluster of error logs that is closest to the new error log based on a distance between a feature vector representation of the new error log, and feature vector representations of error logs of clusters of error logs from the plurality of clusters of error logs.

9. The computer-implemented method of claim 7, further comprising:
determining a class of errors based on the summary; and
sending an alert to a user associated with the class of errors.

10. The computer-implemented method of claim 7, further comprising:
determining a class of errors based on the summary; and
sending instructions to perform an automatic remediation action associated with the class of errors.

11. A non-transitory computer readable storage medium for storing instructions that when executed by a computer processor cause the computer processor to perform steps for performing predictions, the steps comprising:
clustering error logs generated by a system to generate a plurality of clusters;
selecting a cluster from the plurality of clusters;
determining a cluster characterization score of terms of error logs of the cluster, wherein a cluster characterization score of a term represents a likelihood of the term occurring in the cluster but not in remaining clusters of the plurality of clusters;
selecting a window of consecutive terms of an error log of the cluster, wherein the window maximizes an aggregate value of cluster characterization scores of terms across a plurality of windows obtained from the cluster; and
generating a summary from the window for storing in association with metadata describing the cluster.

12. The non-transitory computer readable storage medium of claim 11, wherein the instructions further cause the computer processor to perform steps comprising:
filtering error logs of the cluster by excluding words having high likelihood of occurrence in the error log but low likelihood of occurrence in the cluster.

13. The non-transitory computer readable storage medium of claim 11, wherein selecting the window comprises, sliding a window across the error log, comprising:
identifying a first window of consecutive words of the error log; and
identifying a second window of consecutive words of the error log that overlaps the first window but excludes one or more words of the first window and includes one or more words from outside the first window.

14. The non-transitory computer readable storage medium of claim 11, wherein clustering error logs comprises:
for each error log, generating a feature vector representing features of the error log; and
clustering feature vectors generated from the error logs to determine the plurality of clusters.

15. The non-transitory computer readable storage medium of claim 14, wherein the feature vector representing features of the error log is extracted from a hidden layer of a neural network, wherein the neural network receives a representation of the error log as input.

16. The non-transitory computer readable storage medium of claim 11, wherein the instructions further cause the computer processor to perform steps comprising:
receiving a new error log;
determining a cluster of error logs to which the new error log belongs; and
performing an action based on the summary.

17. The non-transitory computer readable storage medium of claim 16, wherein determining a cluster of error logs to which the new error log belongs comprises identifying the cluster of error logs that is closest to the new error log based on a distance between a feature vector representation of the new error log, and feature vector representations of error logs of clusters of error logs from the plurality of clusters of error logs.

18. The non-transitory computer readable storage medium of claim 16, wherein the instructions further cause the computer processor to perform steps comprising:
determining a class of errors based on the summary; and
sending an alert to a user associated with the class of errors.

19. The non-transitory computer readable storage medium of claim 16, wherein the instructions further cause the computer processor to perform steps comprising:
determining a class of errors based on the summary; and
sending instructions to perform an automatic remediation action associated with the class of errors.

20. A computer system comprising:
a computer processor; and
a non-transitory computer readable storage medium for storing instructions that when executed by a computer processor cause the computer processor to perform steps for performing predictions, the steps comprising:
clustering error logs generated by a system to generate a plurality of clusters;
selecting a cluster from the plurality of clusters;
determining a cluster characterization score of terms of error logs of the cluster, wherein a cluster characterization score of a term represents a likelihood of the term occurring in the cluster but not in remaining clusters of the plurality of clusters;
selecting a window of consecutive terms of an error log of the cluster, wherein the window maximizes an aggregate value of cluster characterization scores of terms across a plurality of windows obtained from the cluster; and
generating a summary from the window for storing in association with metadata describing the cluster.

* * * * *